Figure 1:
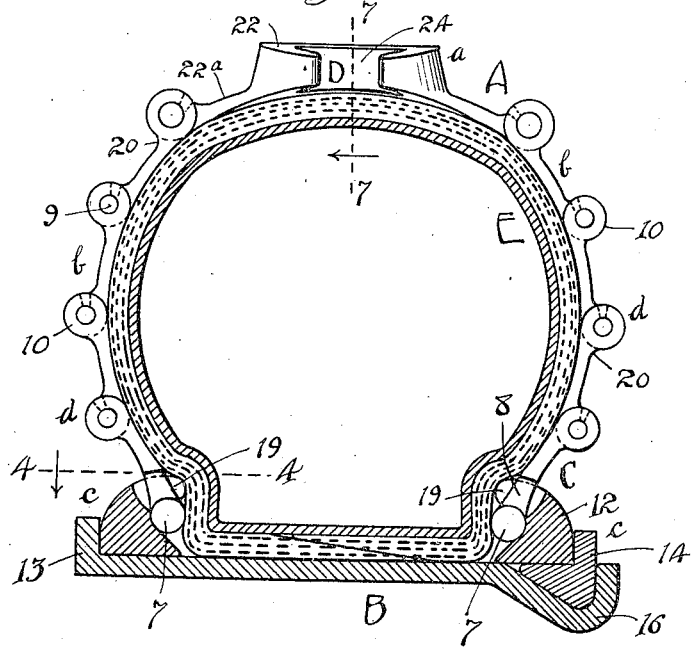

A. W. SAVAGE.
VEHICLE TIRE.
APPLICATION FILED FEB. 13, 1911.

1,075,992.

Patented Oct. 14, 1913.
2 SHEETS—SHEET 1.

Witnesses
Geoffrey G. Holt
E. C. Moesker

Inventor,
Arthur W. Savage,
By Beckert & Blakelee,
his Attorneys.

A. W. SAVAGE.
VEHICLE TIRE.
APPLICATION FILED FEB. 13, 1911.
1,075,992.
Patented Oct. 14, 1913.
2 SHEETS—SHEET 2.
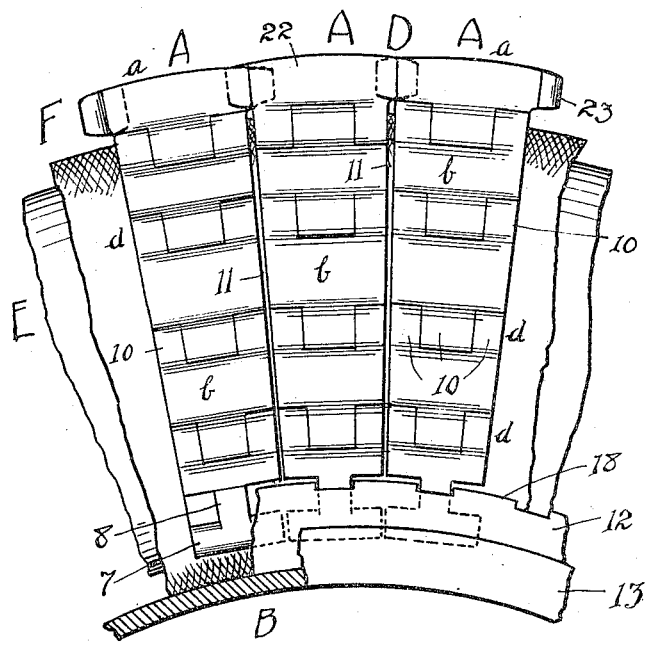
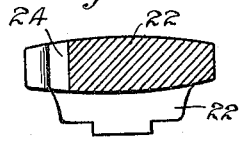
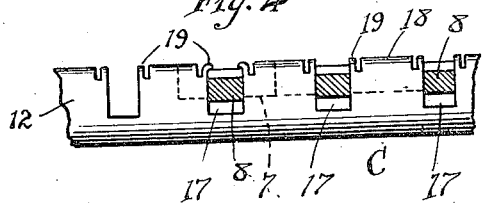
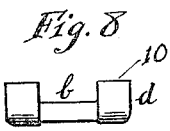
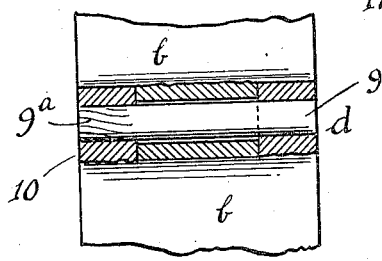
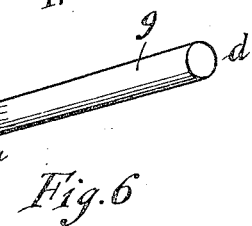
Witnesses
Geoffrey G. Holt.
E. C. Moesker.
Inventor,
Arthur W. Savage;
By Bicker & Blakeslee,
his Attorneys

UNITED STATES PATENT OFFICE.

ARTHUR W. SAVAGE, OF DUARTE, CALIFORNIA.

VEHICLE-TIRE.

1,075,992. Specification of Letters Patent. Patented Oct. 14, 1913.

Application filed February 13, 1911. Serial No. 608,349.

*To all whom it may concern:*

Be it known that I, ARTHUR W. SAVAGE, a citizen of the United States, residing at Duarte, in the county of Los Angeles and State of California, have invented new and useful Improvements in Vehicle-Tires, of which the following is a specification.

This invention relates to vehicle tires, and more particularly to tires for automobiles and motor vehicles; and it has for its object to provide an improved vehicle tire which will be superior in point of relative inexpensiveness of construction, durability, length of life, and facility in assembling and taking apart, which will be approximately devoid of liability to puncture or blow out, which will effectively resist the tendency to skid or slip, by the use of which a more efficient traction may be obtained, and which will be generally superior in efficiency and serviceability.

In the main, the invention comprises, in preferred embodiment, a plurality of articulated sections the ends of which are detachably connected with the wheel, and all of the sections being interrelated and serially united to provide a substantially continuous entirety within which, or between which and the wheel is inclosed and incased the pneumatic tube which supplies the resilience and cushion for the tire.

The invention contemplates particular and highly advantageous means entering into the construction, organization, formation and assemblage of the tire sections above referred to, all as hereinafter described, shown in the drawings and finally pointed out in claims.

Figure 2:
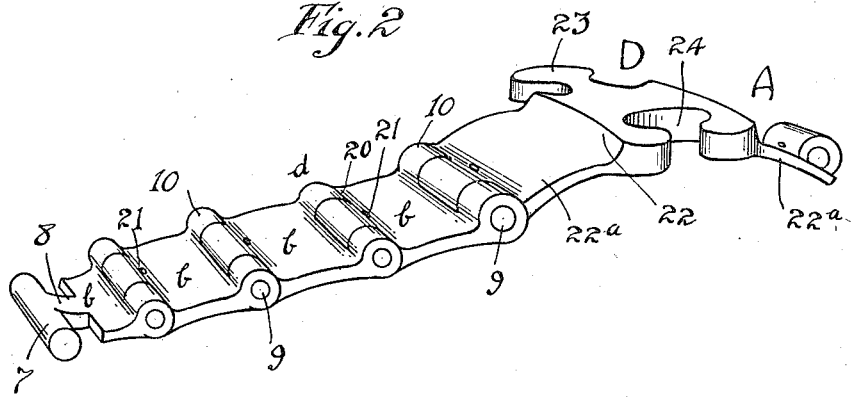

In the drawings: Figure 1 is a transverse sectional view of a tire, and a portion of a wheel with which the tire is connected, all in accordance with the invention, parts being in full lines; Fig. 2 is an isometric view of one of the tire sections in detached position; Fig. 3 is a side elevation, partly fragmentary and broken away and partly in section, of the construction shown in Fig. 1; Fig. 4 is a detail sectional view, taken upon the line 4—4, Fig. 1, and looking in the direction of the appended arrow, the showing being at an angle of 90 degrees with relation to that in Fig. 1; Fig. 5 is an enlarged detail sectional view through hinge means by which the parts of the articulated sections are connected; Fig. 6 is a perspective view of a hinge member or pintle included in the hinge means shown in Fig. 5; Fig. 7 is a detail transverse sectional view taken upon the line 7—7, Fig. 1, and looking in the direction of the appended arrow; Fig. 8 is an end view of one of the parts of the sections of the tire.

Corresponding parts in all the figures are denoted by the same reference characters.

Referring with particularity to the drawing, A designates in each instance one of the tire sections, B designates the felly of a wheel with which the tire sections are connected by securing means C at both sides of the felly, said securing means being provided with locking means $c$, whereby the securing means are held in operative positions; and D designates interlocking means or operative connections between the several sections A, through the agency of which the several sections are combined in a unitary approximately continuous tire formation, there being however narrow spaces between adjacent sections, and the interlocking means D permitting play as between and among the several sections A, so that the sections may relatively approach and separate as the tire traverses the roadway, and so that the tread portions $a$, of the sections, may be capable of movement radially of the wheel, under varying degrees of compression of the tire. From the tread portions $a$, at each side, extend a plurality of section parts or links $b$, and the terminal parts $b$ are provided with connection heads 7, joined therewith by narrow necks 8, and formed for engagement with the securing means C. The several section parts or portions $a$ and $b$ are joined by hinge means $d$, comprising pintles 9 and knuckles 10. Within and surrounded by the sections A and the felly B is the pneumatic tube E, a flexible covering or sheath F being interposed between the tube and the sections as a protection against frictional disruption of the pneumatic tube. The slight spaces between adjacent sections A are designated at 11.

The general organization and combination of the parts and features will be evident from the drawings and the above statement of the same, and I will now enter into a discussion and definition of the specific features of construction and formation entering into the embodiment of the invention as shown in the drawings.

The securing means C comprise endless hoops or rings 12 which are disposed at the sides of the felly B, in contact with a side flange 13 thereon and a flange 14 upon a locking wedge 15 constituting the locking means $c$, the same abutting against one of the rings 12, and fitting within a pocket 16 in the felly B, at one side thereof. All of this latter construction and arrangement may follow standard practice. The rings 12 are however provided with a plurality of spaced slots 17, developed inwardly from the inner free edges 18 thereof, said slots receiving the necks 8 of the cylindrical connection heads 7 of the end section parts $b$, the rings 12 being transversely curved, as shown in Figs. 1 and 4, whereby the heads 7 are firmly engaged with the rings inwardly of and beneath the same. The free edges 18 of the rings 12 are likewise slotted adjacent to the slots 17 to produce ears 19 which may be bent around the necks 8 to temporarily hold the connection heads in engagement with the rings 12, as in assembling, and which ears may be filed off or bent back to permit the connection heads to be disengaged from the rings. The knuckles 10 are of continuous solid formation, and are so formed upon the section parts $a$ and $b$ that each of such parts is connected with the next part by two outer knuckles on one part and an inner knuckle on the other, and the pintles 9 are of the same length as the total length of the three knuckles combined, said pintles having each a fixed rigid connection with the outer knuckles, but the inner knuckle fitting the respective pintles so as to permit of hinge action. The pintles 9 are roughened at one end, as at $9^a$, and the opposite end is driven through the three knuckles, under heavy blows of a suitable implement, so that the roughened end finally intimately interlocks with one side knuckle, both ends of the pintle firmly joining with the outside knuckles in unyielding connection, all as most clearly shown in Fig. 5.

Each of the parts or portions $a$ and $b$, which parts have a slight longitudinal curvature to form a total transverse tire curvature, is provided with a fillet or thickened portion 20, where the solid knuckles 10 merge into the body portions of such parts $a$ and $b$, and in each of the fillets 20 adjacent to the intermediate knuckles 10, is formed an oil opening 21. All of the parts or portions $a$ and $b$ are drop-forged or stamped out of suitably durable material such as steel of selected quality. The tread portions $a$ are relatively larger than the portions or links $b$, and the curvature thereof is of an arc of greater radius, relatively in the dimensions thereof between the next adjacent section parts or links $b$, whereby a slight flattening of the tire formation at and adjacent to the central portion thereof is produced as clearly shown in Fig. 1. The tread portion $a$ of each of the sections A has a slight exterior convex curvature in the plane of the circumference of the wheel, and also a similar slight interior convex curvature. Each of said tread portions is provided with an outwardly projecting body 22, of increased thickness with relation to the end portions $22^a$ of such tread portion $a$, and at one side the same is provided with a locking head 23, the opposite side of the same being provided with a locking recess 24, formed to receive and fit a similar locking head 23 upon the next adjacent section A, the dimensions of such formations permitting a slight relative play between the connected parts, which jointly constitute the interlocking means or operative connections D; and the slight relative play of adjacent sections A, in diminution or enlargement of spaces 11 between the same, in the operation of the complete tire as hereinafter pointed out. The general conformation of the heads 23 and recesses 24 include curvatures complementary as between the heads and recesses, both heads and recesses tapering in such manner as to produce a perfect interlocking fit.

The operation, method of use and advantages of the improvements hereinabove described will be readily understood from the accompanying drawings and the following statement: The sections A are assembled serially with the rings 12, by means of the connection heads 7, around the protective sheath F and the pneumatic tube E, and the locking means $c$ are caused to bind the rings 12 and the sections A in firm connection with the felly B of the wheel. The pneumatic tube E is then inflated in the usual manner. The ears 19 being bent over as the sections are successively connected with the rings, prevents displacement thereof, until the entire assemblage is completed, the heads 23 of the tread portions $a$ being passed into the respective recesses 24, so that all of the sections are interlocked and form a continuous tire organization, the sections of which are normally slightly spaced as at 11. These spaces 11 permit the sections to relatively approach at the portions of the tire which are compressed by tractive engagement with the roadway, the tire being slightly flattened at such point, and being accommodated in such flattening by the flattened curvature of the tread portion $a$ as above set forth. The transverse exterior and interior convexity of the tread portions $a$ insures a proper rolling contact, as between the tire and the ground, and a proper impingement of the tread portions upon the pneumatic tube E or the sheath F over the same, minimizing frictional wear. The loose fit of the locking heads 23 and recesses 24 permits of the bunching together of the sections, so to speak, at the part of the tire which is in engagement with the roadway; and the tread portions are permitted to have radial play, so as to contact yieldingly with the roadway. The location of the oiling holes 21 in connection with the fillets 20 assists a direct flow of the oil to the proper places, and the fillets materially strengthen the members or portions a and b adjacent to the hinge means d, which latter are of durable organization and effectively hold under heavy strains. Each of the tire sections is definitely located in its proper place, in connection with the rings 12, preventing slipping or displacement of the sections, and all the sections operate in a unitary manner in tractively engaging with the roadway. Each of the sections is, manifestly, separately removable, for purposes of repair or replacement.

As shown in the drawings, all of the section parts b have slight longitudinal curvature to fit the same to the general transverse curvature of the tire, and the edges of all the members a and b, which contact with the sheath F, are rounded to prevent abrasive or frictional destructive action. Also, the projecting body 22 of each of the tread portions a acts to positively engage with the roadway in tractive contact.

In conclusion, it will be noted that the entirety is possessed of extreme durability in connection with a yielding relation as between parts, which permits of perfect action of the air cushion in the pneumatic tube E. The danger of blow outs or punctures is extremely minimized if not entirely obviated, producing a total tire device of long life and of reliability of performance under the most strenuous working conditions. The tire may be readily repaired, as damage to any part of any one section may be repaired without removing or operating upon any of the other sections.

In conclusion, I do not desire to be understood as limiting myself to the particular construction, formation and combination of parts, members and features shown and described; but reserve the right to vary the same, in adapting the improvements to varying conditions of use, without departing from the spirit of the invention and the terms of the following claims:

Having thus described my invention I claim and desire to secure by Letters Patent:—

1. A vehicle tire, comprising a plurality of sections, and securing means for connecting each of said sections separately with the felly of a wheel; said securing means comprising rings fitted to the felly of the wheel and provided with spaced slotted portions; each of said sections being provided at each end with a neck fitting one of said slotted portions and with a relatively enlarged head formed to engage with the inner surface of the respective ring; there being ears upon the rings formed to engage with the necks.

2. A vehicle tire comprising a plurality of separate sections, securing means for connecting the same with a wheel of the vehicle, each of the sections being provided with a tread portion, and inter-locking means between and detachably connecting adjacent tread portions; said inter-locking means comprising inter-locking heads and recesses open at one side, the latter of which extend entirely through the tread portions.

3. A vehicle tire, comprising a plurality of separate sections, securing means for connecting the same with a wheel of the vehicle, each of the sections being provided with a tread portion, and interlocking means between and detachably connecting adjacent tread portions; said interlocking means comprising interlocking heads and recesses open at one side, the latter of which extend entirely through the tread portions and normally entirely contain the heads.

4. A vehicle tire, comprising a plurality of separate sections, securing means for connecting the same with a wheel of the vehicle, each of the sections being provided with a tread portion, and interlocking means between and detachably connecting adjacent tread portions; said interlocking means comprising interlocking heads and recesses open at one side, the latter of which extend entirely through the tread portions and normally entirely contain the heads; said interlocking heads and recesses being formed to permit relative play between the parts including the same in all directions.

5. In a vehicle tire, a pair of separate sections, means for connecting the same with a wheel of the vehicle, and interlocking means between and detachably connecting the sections; said interlocking means comprising a head upon one section, the other section being formed with a recess to receive said head in interlocking relation; said recess being open at one side, and said head fitting said recess so as to permit relative play between said sections in all directions.

6. A vehicle tire, comprising a plurality of separate sections, securing means for detachably connecting each of the sections with a wheel of the vehicle, said securing means comprising detachable members upon the wheel and connection heads provided with necks formed for engagement therewith, each of the sections being provided with a projecting head and each adjacent section being formed with a recess adapted to receive said head in interlocking relation between said adjacent sections; each of said recesses being open at one side and the respective head having play therein in all directions.

7. A vehicle tire, comprising a plurality of separate articulated sections, means for detachably connecting each of the same with a wheel of the vehicle, each of the sections comprising a tread portion and a plurality of parts having hinge connection therewith; each of said tread portions being formed with a projecting head and with a recess whereby said tread portions may be detachably connected in interlocking relation in a series, each of said recesses being formed to receive the head upon the next adjacent section and permitting relative play in all directions between such adjacent sections, each of said recesses being open at one side; the parts of each section connected with the tread portion having each a longitudinal curvature conforming to the general cross sectional curvature of the tire, and each tread portion having a curvature flattened with relation to the curvature of the section parts connected therewith.

In testimony whereof, I have signed my name to this specification in the presence of two subscribing witnesses.

ARTHUR W. SAVAGE.

Witnesses:
RAYMOND I. BLAKESLEE,
C. P. WARDEN.

Copies of this patent may be obtained for five cents each, by addressing the "Commissioner of Patents, Washington, D. C."